Sept. 29, 1942.  W. G. GREVE  2,297,551
MACHINE FOR CUTTING ARCUATE INTERNAL GROOVES IN HOLLOW MEMBERS
Filed April 23, 1941  3 Sheets-Sheet 2
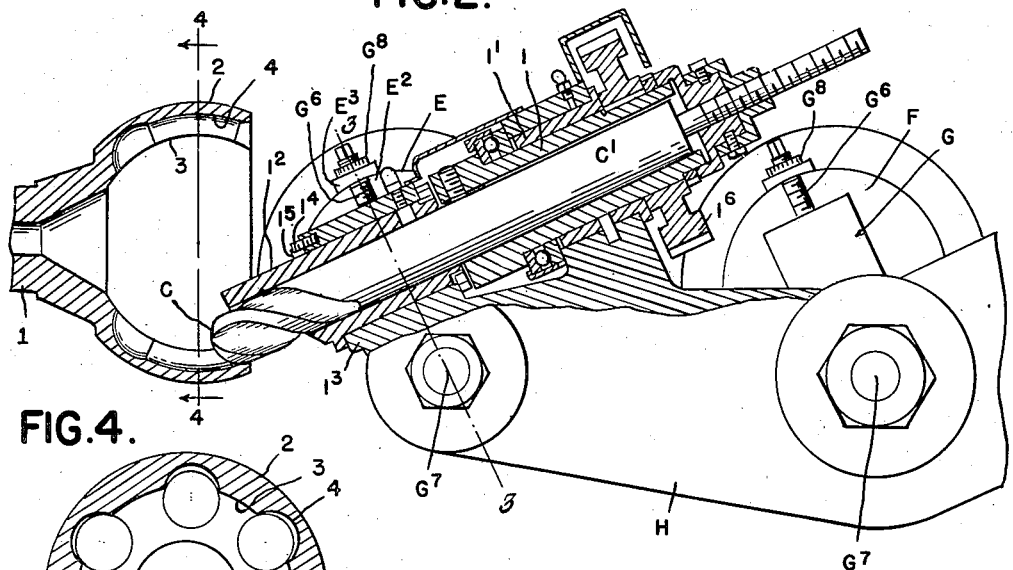
FIG. 2.
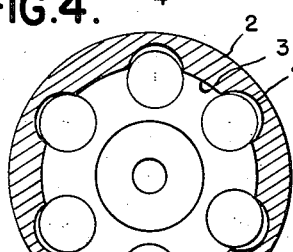
FIG. 4.
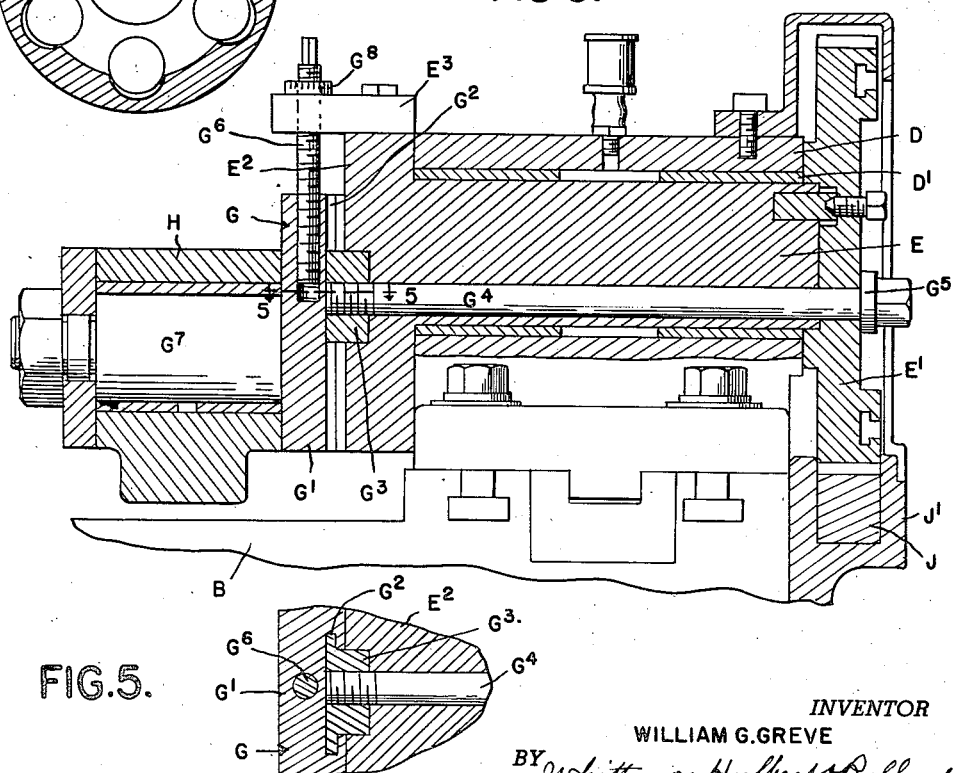
FIG. 3.
FIG. 5.
INVENTOR
WILLIAM G. GREVE
BY Whittemore Hulbert & Belknap
ATTORNEYS Sept. 29, 1942.　　　　　W. G. GREVE　　　　　2,297,551
MACHINE FOR CUTTING ARCUATE INTERNAL GROOVES IN HOLLOW MEMBERS
Filed April 23, 1941　　　3 Sheets-Sheet 3

INVENTOR
WILLIAM G. GREVE
BY Whittemore Hulbert & Belknap
ATTORNEYS

Patented Sept. 29, 1942

2,297,551

UNITED STATES PATENT OFFICE 2,297,551

MACHINE FOR CUTTING ARCUATE INTERNAL GROOVES IN HOLLOW MEMBERS

William G. Greve, Detroit, Mich., assignor to The Gear Grinding Machine Company, Hamtramck, Mich., a corporation of Michigan Application April 23, 1941, Serial No. 390,003

8 Claims. (Cl. 77—5)

The invention relates to machines for cutting internal arcuate grooves in hollow members and more particularly to a construction designed for the cutting of ball race grooves in torque transmitting universal joints.

It is an object of the invention to obtain a construction by which arcuate grooves of a predetermined radius may be cut in the inner surface of a hollow member to be concentric with a common point lying in the axis thereof.

It is a further object to obtain a construction which may be used for imparting an arcuate form to straight grooves previously cut in a member by a different machine, such, for instance, as by a straight drilling operation. This prior operation, by removing the greater part of the stock, lessens the amount of work to be performed in imparting the arcuate contour.

With these objects in view, the invention consists in the construction as hereinafter set forth.

In the drawings:

Fig. 2 is a vertical longitudinal section through a portion of the machine showing the cutting tool in engagement with the work;

Fig. 3 is a transverse section on line 3—3 of Fig. 2;

Fig. 4 is a cross section on line 4—4 of Fig. 2;

Fig. 5 is a cross section on line 5—5 of Fig. 3;

Fig. 7 is a diagram illustrating the principle of operation.

Figure 1:
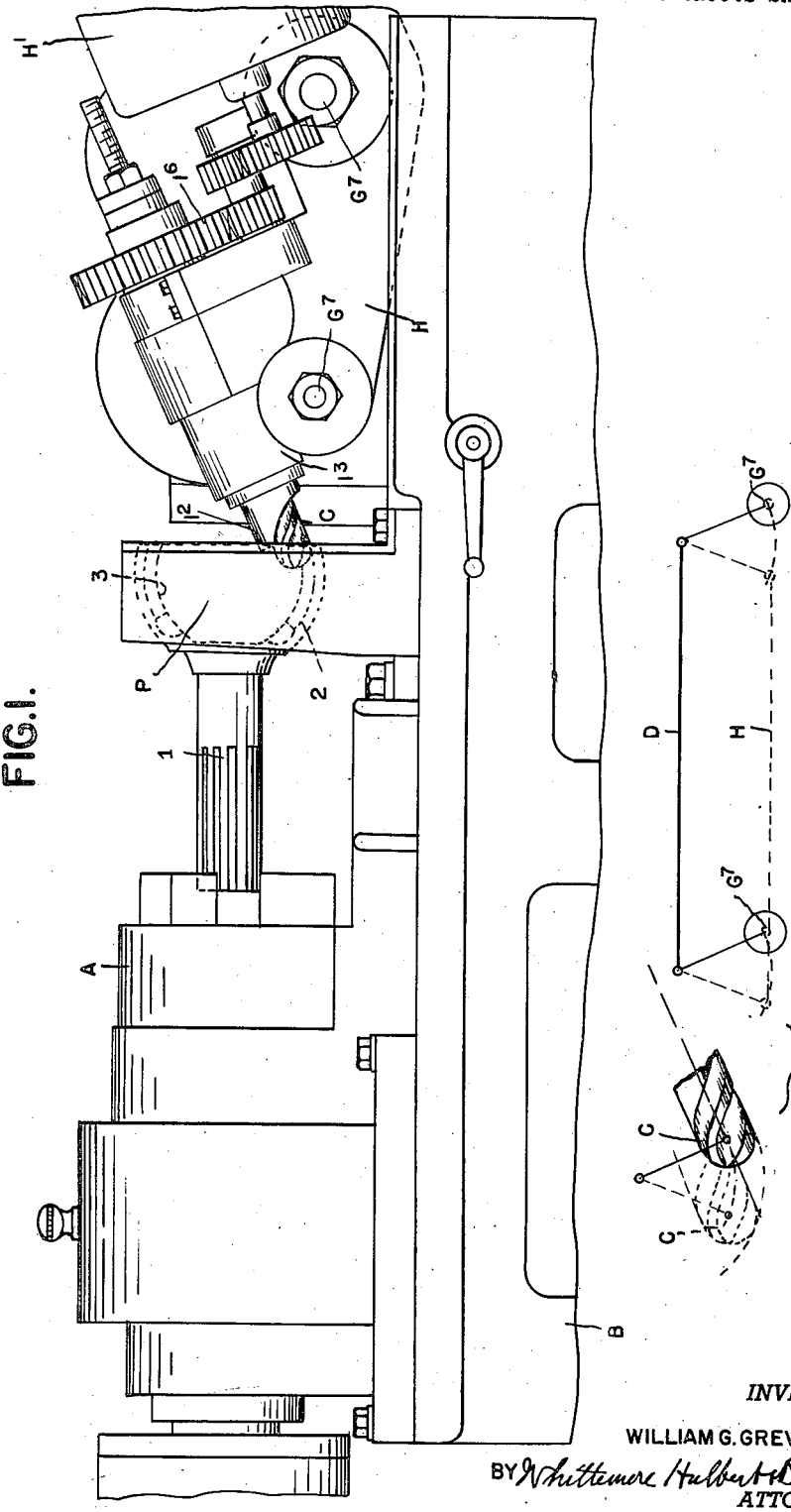
Fig. 1 is a side elevation of the machine.
Figure 6:
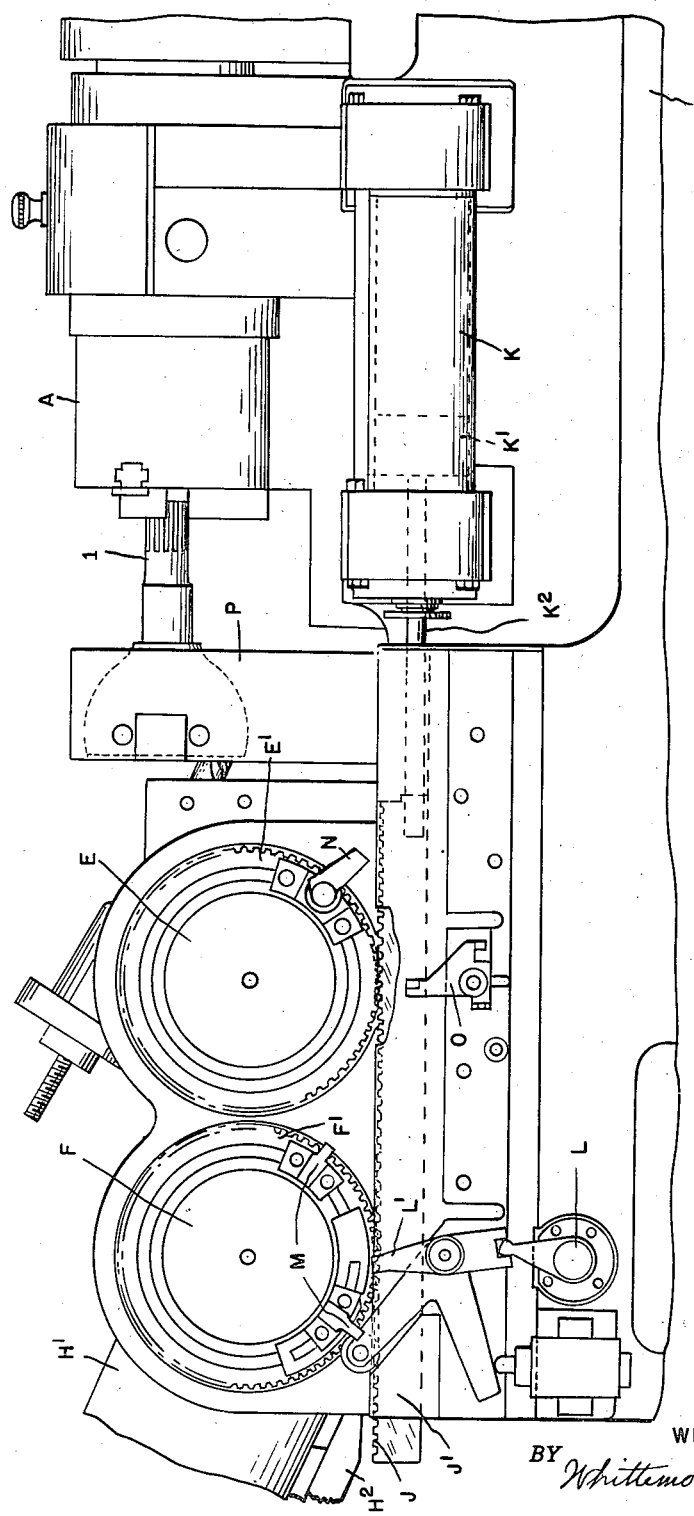
Fig. 6 is an elevation of the opposite side of the machine from Fig. 1.

While my improved machine is adapted for various uses, I shall confine the illustration and description of the same to the one use of forming ball race grooves in the female member of a torque transmitting universal joint. Such member has a shank I and an enlarged hollow head 2, which latter has a spherical inner surface 3 with a plurality of longitudinally extending arcuate grooves 4 therein, said grooves being uniformly spaced about the axis and concentric with a common point therein. The radial distance from this center is varied in different sizes of the universal joints, and therefore suitable provision must be made for varying the arcuate curve. Also, as the grooves are within a hollow member, the clearance for the cutting tool is relatively slight.

General construction

As above stated, the machine is designed to operate upon blanks which have been previously machined to form straight grooves therein. It is, however, necessary to provide the machine with a rotary work support and an indexing mechanism for intermittently rotating the work to successively register the straight grooves therein with the arcuate cutter. As the construction of this work holding and indexing mechanism forms no part of the instant invention, I have merely illustrated a chuck A for engaging the shank I. It will be understood that this chuck is connected to an indexing mechanism (not shown). The groove forming mechanism is mounted on a bed B, which also supports the work holding and indexing mechanism. This groove cutting mechanism comprises generally a rotary segmental spherical cutter C and a carrier for said cutter, by which it is moved through an arcuate path into and out of the member 2 and concentric with a point lying within the axis of said member. The movement of the cutter alternates with the indexing of the work, so that the straight grooves are successively refashioned to arcuate form.

Specific construction of groove cutting mechanism

Mounted on the bed B is a head or frame member D, and E and F are parallelly arranged rotary members extending transversely through said member D and journaled for rotation in bearings D'. The member E has a gear wheel E' secured to one end thereof, while at its other end is a disc head E². G is an adjustable throw crank secured to the head E² and comprising a member G' bearing against the face of the head, having a T-slot G² extending the length thereof. G³ is a key member having a T-head engaging the T-slot G², and G⁴ is a clamping bolt having a threaded engagement with the key G³ and extending through the member E and gear wheel E' to a shouldered head G⁵. The member G' has a threaded socket at one end thereof engaged by a screw G⁶, which has a swivel engagement with a bracket member E³ on the head E². The arrangement is such that by revolving the screw G⁶, the member G' may be adjusted on the head E² and may be clamped to any position of adjustment by tightening the bolt G⁴, which, through the T-head on the member G³, clamps the member G' to the head E². The member G' has a crank pin G⁷ projecting outward therefrom, and the radial throw of this crank will be determined by the adjustment of the screw G⁶. A micrometer gauge G⁸, adjacent to the head of the screw G⁶, facilitates the accurate setting of the same.

The rotary member F is provided at one end with a gear wheel F' and at its opposite end with an adjustable throw crank similar to the construction above described and having parts thereof designated by the same reference letters. Mounted on the two crank pins $G^7$ is a member H which forms a carriage for the rotary cutter and the motor for driving the same. The motor H' is mounted on a shelf $H^2$, integral with the member H and extending rearwardly of the crank F. This motor is connected through an intermediate gear train, with a hollow spindle I journaled in a bearing I' mounted at the forward end of the member H. The hollow spindle I receives the shank C' of the rotary cutter C, which is preferably a twist drill, and the axis of the spindle is inclined downwardly in a forward direction, so that the axis of the drill will have the same inclination. $I^2$ is a tubular reinforcing member for the portion of the shank C' which projects beyond the bearing I', and this reinforcing member is secured in a bearing $I^3$ on the member H forward of the bearing I'. The member $I^2$, on its upper side, extends along the shank I' to the point of tangency thereof with the curve of the segmental spherical cutter C, but on its under side this member $I^2$ is cut away to provide clearance for the cutter and for the work. However, as in performing the work the thrust against the cutter is in an upward direction, the member $I^2$ will adequately reinforce the same. The member $I^2$ is held from rotation with the shank C' by a locking pin $I^4$ engaging a notch in a flange $I^5$ and a socket in the bearing $I^3$. The gear train $I^6$, intermediate the motor H' and the hollow spindle I, may be of any suitable construction including change gears, through which the speed of rotation of the spindle may be varied according to the specific work to be performed.

*Actuating and controlling mechanism for the cutter*

The gear wheels E' and F' are in mesh with a rack bar J which is longitudinally slidable in a guideway J'. K is the cylinder of a reciprocatory hydraulic motor having a piston K' therein connected by piston rod $K^2$ with the rack bar J. L is a reversing valve controlling the admission of hydraulic fluid alternately to opposite ends of the cylinder K, which valve is operated by a rocker member L' mounted on the bed below the gear wheel F. This rocker member in turn is operated by dogs M, which are adjustably secured to the gear wheel F and may be arranged in such relation to each other as to control the stroke of the piston K' in the cylinder K. This will determine the length of oscillation of the cranks G and of the cutter C during the performance of its work. The indexing mechanism is controlled in its operation by a dog N adjustably mounted on the gear wheel E and cooperating with a rocker member O mounted on the bed. As the detailed construction and operation of the indexing mechanism is not a part of the instant invention, it will be sufficient to state that the setting of the dog N will time the indexing operation with the oscillation of the cutter C so that it occurs during the period when said cutter is withdrawn from the work and is completed prior to the reengagement of the cutter with the work.

*Setting of machine for operation*

In setting the machine for grooving operation upon a particular piece of work, the shank 1 of the blank is first engaged with the chuck A and adjusted in relation to the indexing mechanism so that the previously cut straight grooves will be successively registered with the path of the cutter. The portion 2 of the blank is additionally supported during the performance of the work by a steady rest engaging the same, which, not being a part of the instant invention, is only illustrated diagrammatically at P. This will receive the outward thrust of the cutter and will hold the work from displacement. In setting the cutter in relation to the work, the radius of the arcuate path of the cutter is determined by adjustment of the throw of each crank G, which is accomplished by adjustment of the screw $G^6$, as previously described. This should be so adjusted that the throw of the crank corresponds to the radial length from the axis of the work to the center of the spherical cutter C. The throw of each of the two cranks is precisely the same so as to produce in connection with the member H a parallelogram movement. This will cause each point in the member H and the elements mounted thereon to trace a curve which is the same as that of each crank. Consequently, the center of the spherical cutter travels through such arc, but the curve traced by the periphery of the cutter will be of a longer radius, this being equal to the sum of the throw of the crank and the radius of the cutter. However, as the arcuate grooves are designed to receive balls, the radius from the center of the cutter is the controlling dimension. The cutting edges of the cutter form segments of a circle and preferably extend to form a semi-spherical surface of revolution. The speed of revolution of the cutter may be determined to suit the particular work, by change gears in the gear train $I^6$.

The dogs M and N are also adjusted respectively on the gear wheels F' and E', so as to regulate the length of arcuate movement and to time the operation of the indexing mechanism.

*Operation*

In operation, the hydraulic motor K will impart a reciprocatory movement to the rack bar J, which will oscillate the gear wheels E' and F' through a length of arc determined by the setting of the dogs M. This will rock the cranks G which in turn will oscillate the member H and all of the elements supported thereon. In one phase of this oscillation, the cutter C will enter one of the straight grooves 4 and, during its operation, will deepen said groove, changing it into an arcuate form. The opposite phase of the oscillation will remove the cutter from the groove and continue the movement sufficiently to provide time for the operation of the indexing mechanism prior to engagement with another groove. The cycles are continued until all of the grooves have been deepened and changed into arcuate form.

What I claim as my invention is:

1. In a grooving machine, a rotatably adjustable holder for a hollow work member, a segmental spherical rotary cutter, and means for reciprocating said cutter through an arcuate path from a position without said hollow member into operative engagement with an inner portion thereof, the center of said arcuate path lying in the axis of said work holder.

2. In a grooving machine, the combination with a rotatably adjustable holder for a hollow work member, a carriage, a segmental spherical cutter rotatably mounted on said carriage to project forward therefrom, and means for imparting to said carriage a reciprocatory arcuate parallelogram movement to carry said cutter through a similar path from a position without said hollow member into operative engagement with an inner portion thereof, the center of movement of said cutter lying in the axis of said work holder.

3. In a grooving machine, the combination with a rotatably adjustable work holder, a carriage, a cutter rotatably mounted on said carriage, means for imparting to said carriage a reciprocatory arcuate parallelogram movement to carry said cutter through a similar path into operative relation to the work in said holder, the center of movement of said cutter lying in the axis of said work holder, and means for adjusting the radial length of said arcuate movement.

4. In a grooving machine, a rotatably adjustable holder for a hollow work member, a carriage, means for imparting to said carriage an oscillatory arcuate parallelogram movement, the axis of movement of each point therein intersecting the axis of said rotary work holder, and a rotary cutter mounted on said carriage to project forward therefrom and to be movable therewith into said hollow member, the axis of rotation of said cutter being located in that plane of the axis of said work holder which is perpendicular to the axes of movement of said carriage.

5. In a grooving machine, the combination with a rotary work holder, of a pair of cranks of equal radii, an arm carried by said cranks, a rotary cutter mounted on said arm to project forward therefrom and to be carried thereby into operative engagement with the work in said holder, the axes of said cranks being located in a plane of the axis of said work holder and said rotary cutter being in a plane of the axis of said work holder perpendicular to the aforesaid plane, and means for similarly adjusting the radial length of throw of said cranks.

6. In a grooving machine, the combination with a work holder, of a pair of cranks of equal radii, an arm mounted on said cranks, means for imparting to said cranks a reciprocatory movement, a rotary cutter mounted on the forward end of said arm to project therefrom into operative relation to the work, a motor mounted on the rear end of said arm, and a transmission mechanism also mounted on said arm between said motor and rotary cutter.

7. In a grooving machine, a supporting frame, a pair of parallelly arranged crank shafts mounted on said frame, parallelly arranged crank arms on said crank shafts, crank pins adjustably mounted on said arms to change the throw thereof, an arm mounted on said crank pins having a portion projecting forwardly therefrom, a rotary spindle mounted on said forwardly projecting portion having its axis inclined forwardly and downwardly therefrom, a rotary cutter mounted on the lower forward end of said spindle, a shelf connected to and extending rearward from said arm, a motor mounted on said shelf, and a variable speed transmission mechanism intermediate said motor and said rotary spindle.

8. In a grooving machine, a supporting frame, a pair of parallelly arranged crank shafts mounted on said frame, parallelly arranged crank arms on said crank shafts, crank pins adjustably mounted on said crank arms to change the throw thereof, an arm mounted on said crank pins, a rotary cutter mounted on said arm to project forward therefrom, means for imparting an oscillatory movement to said crank shafts, and means for varying the length of said movement.

WILLIAM G. GREVE.